(12) United States Patent
Murakoshi et al.

(10) Patent No.: US 6,206,037 B1
(45) Date of Patent: Mar. 27, 2001

(54) FUEL SUPPLYING APPARATUS

(75) Inventors: Masatoshi Murakoshi; Hiroyasu Ohsawa; Hiroshi Morikawa, all of Hamakita (JP)

(73) Assignee: Toyo Roki Seizo Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/265,832

(22) Filed: Mar. 10, 1999

(30) Foreign Application Priority Data

Mar. 12, 1998 (JP) .................................................. 10-061622
Mar. 5, 1999 (JP) .................................................. 11-058891

(51) Int. Cl.[7] .................................................. F02M 37/22
(52) U.S. Cl. .............................. 137/565.34; 137/565.22; 123/509
(58) Field of Search ........................ 137/565.17, 565.34, 137/565.22, 565.24, 574; 123/509, 514

(56) References Cited

U.S. PATENT DOCUMENTS

| 4,694,857 | * | 9/1987 | Harris ............................... 137/565.24 |
| 5,038,741 | * | 8/1991 | Tuckey ................................. 123/509 |
| 5,040,516 | * | 8/1991 | Haraguchi ........................... 123/509 |
| 5,522,425 |   | 6/1996 | Kroiss et al. . |
| 5,613,476 | * | 3/1997 | Oi et al. ............................... 123/509 |
| 5,669,359 | * | 9/1997 | Kleppner et al. ..................... 123/509 |
| 5,699,773 | * | 12/1997 | Kleppner et al. ..................... 123/510 |
| 5,769,061 | * | 6/1998 | Nagata et al. ........................ 123/509 |
| 6,000,913 |   | 12/1999 | Chung et al. . |
| 6,029,633 | * | 2/2000 | Brandt .................................. 123/509 |

FOREIGN PATENT DOCUMENTS

| 3510890A1 | 10/1986 | (DE) . |
| 19912494A1 | 9/1999 | (DE) . |
| 0616125A1 | 9/1994 | (EP) . |
| 3510890A1 | 10/1997 | (EP) . |
| 0845590A2 | 6/1998 | (EP) . |

* cited by examiner

Primary Examiner—John Rivell
(74) Attorney, Agent, or Firm—Young & Thompson

(57) ABSTRACT

A fuel supplying apparatus includes a reservoir to be inserted from an opening portion provided in an upper portion of a fuel tank, a tank cover for closing the opening portion of the fuel tank, and a coupling mechanism for coupling the reservoir and the fuel tank with each other so as to be mutually displaceable. The coupling mechanism comprises a retainer member rotatably connected to the reservoir through a predetermined pivot, and at least one coupling member for coupling the retainer member and the tank cover with each other so that the pivot can be moved in a vertical direction of the fuel tank relative to the tank cover.

11 Claims, 12 Drawing Sheets

FUEL SUPPLYING APPARATUS

BACKGROUND OF THE INVENTION

1. Field of the Invention

The present invention relates to a fuel supplying apparatus, mounted in a fuel tank, in which components such as a fuel pump and the like for supplying fuel are assembled as a module.

2. Description of the Related Art

As an apparatus for taking fuel out of a fuel tank of an automotive vehicle and for supplying the fuel to a fuel injection device or the like, there is an approach in which a reservoir installed within the fuel tank and a tank cover for closing an opening portion formed in an upper portion of the fuel tank are connected to each other, and components such as the reservoir, a fuel pump, a fuel filter, a pressure regulator and the like are assembled into a module that is attachable to or detachable from the fuel tank (see Japanese Examined Patent Publication Hei 7-109179 and German Patent Application Laid-Open DE3510890, for example).

In the fuel supplying apparatus disclosed in the above-described publications, in order to cope with the deformation of the fuel tank corresponding to the pressure difference between the interior and the exterior thereof, the vibration of the automotive vehicle or the like, the tank cover mounted on the upper portion of the fuel tank and the reservoir located on the bottom portion of the fuel tank are coupled with each other to be mutually displaceable in the vertical direction of the fuel tank (i.e., in an axial direction of the opening portion of the fuel tank).

However, since the reservoir is formed into a cylindrical shape coaxial with the tank cover, if all the components such as the fuel pump, the fuel filter and the like are disposed between the tank cover and the reservoir, a large space is needed therebetween, causing a height of the fuel tank to be increased. In order to solve this problem of the increased height, it is possible to make an approach to increase diameters of the reservoir and the tank cover. However, in this case, since the area of the opening portion of the fuel tank is increased, this is disadvantageous in view of the mechanical strength of the fuel tank.

U.S. Pat. No. 5,038,741 discloses a fuel supplying apparatus in which a cylindrical container receiving therein a fuel pump is connected to the tank cover through a bellows, and the fuel pump and the above-described container are slanted obliquely to be installed within the fuel tank by utilizing the elastic deformation of the bellows. With such an arrangement, a height of the unit is decreased in comparison with the case where the fuel pump and the container are installed in an upright condition just below the opening portion of the fuel tank, and it is possible to make the fuel tank thin without enlarging the opening portion of the fuel tank. However, in this apparatus, a retainer portion provided on the bottom portion within the fuel tank and the reservoir are coupled with each other within the fuel tank to thereby retain the reservoir in a predetermined position. Accordingly, the assembling work of the reservoir is time-consuming. Also, the like problem is encountered upon the removal of the reservoir.

SUMMARY OF THE INVENTION

One object of the present invention is to provide a fuel supplying apparatus in which components such as a reservoir and a fuel pump can efficiently be attached to or detached away from a fuel tank and which can suppress a height of the fuel tank without enlarging an opening portion of the fuel tank.

The present invention will now be described. Incidentally, in order to well understand the present invention, in the following description, the reference numerals are to be added to the components or members in parenthesis but it is apparent that the present invention is not limited to the embodiments shown in the drawings.

In order to attain above-described and other objects of the present invention, according to one aspect of the present invention, there is provided a fuel supplying apparatus (10A, 10B, 10C) comprising an reservoir (11, 41, 51) to be inserted from an opening portion (1b) provided in an upper portion of a fuel tank (1), a tank cover (12) for closing the opening portion of the fuel tank and a coupling mechanism (13, 43) for coupling the reservoir and the fuel tank with each other so as to be mutually displaceable, wherein the coupling mechanism comprises a retainer member (30, 44) rotatably connected to the reservoir through a predetermined pivot (32, 40) and at least one coupling member (31, 47) for coupling the retainer member and the tank cover with each other so that the pivot is movable in a vertical direction of the fuel tank relative to the tank cover.

According to this invention, since the reservoir and the retainer member are rotatably coupled with each other, the posture of entire or part of the reservoir relative to the tank cover can be changed. By utilizing the change of the posture, it is possible to insert at least part of the reservoir beyond the region just below the opening portion of the fuel tank. Accordingly, it is possible to increase the capacity of the reservoir without enlarging the opening portion, and at the same time to reduce also the height of the fuel tank. For example, in the case where the part of the reservoir extends to the deeper portion of the fuel tank, it is possible to suppress the height thereof to reduce the height of the fuel tank while maintaining the capacity to be needed for the reservoir. Also, in the case where all the reservoir is inserted from the region just below the opening portion of the fuel tank to the deeper portion, since the reservoir and the tank cover do not overlap with each other in the vertical direction, it is possible to increase the height of the reservoir to thereby increase its capacity while suppressing the increase of the height of the fuel tank.

Also, since the reservoir installed within the fuel tank and the tank cover are coupled with each other by the retainer member and the coupling member, it is possible to impart a sufficient rigidity to the retainer member or the coupling member to thereby locate the reservoir in a predetermined position within the fuel tank while. Thus, it is not necessary to provide the retainer portion for the reservoir to the inner bottom surface of the fuel tank, and the reservoir can be efficiently attached to or detached away from the fuel tank.

Furthermore, since the pivot for coupling the retainer member and the reservoir with each other can be moved in the vertical direction of the fuel tank, it is possible to relatively move the tank cover and the reservoir in the vertical direction in correspondence with the vibration of the vehicle or the deformation of the fuel tank.

In the fuel supplying apparatus according to the above invention, the coupling mechanism (13, 43) may comprise a biasing device (33, 48, 49) for imparting a force for depressing the reservoir onto a bottom surface (1c) of the fuel tank (1).

According to this embodiment, the reservoir is depressed to the inner bottom surface of the fuel tank by the biasing device so that the lift thereof may be prevented.

The retainer member (30) and the coupling member (31) may be assembled so as to be mutually displaceable in a linear fashion along the vertical direction of the fuel tank (1).

According to this embodiment, the motion of the reservoir coupled through the pivot with the retainer member is limited to both of a rotational motion about the pivot and a linear motion in the vertical direction in association with the movement of the retainer member. Accordingly, there is no possibility that the reservoir installed on the inner bottom surface of the fuel tank would be freely moved along the inner bottom surface.

The pivot (32) may be provided at one end side of the reservoir (11) in a direction along an inner bottom surface (1c) of the fuel tank (1), the fuel supplying apparatus may further comprise a stopper (11c) for allowing the reservoir to rotate in a direction in which another end side of the reservoir moves downwardly below a level of the pivot, and for limiting a rotation of the reservoir in the opposite direction thereto.

According to this embodiment, the lift of the other end side (left end side of FIG. 1) of the reservoir from the inner bottom surface can be prevented by the stopper.

The retainer member (30) may be formed into a hollow cylindrical member connected to the reservoir (11) so as to be rotatable about the pivot (32), and the coupling member (31) may be formed into a shaft member having a lower end slidably inserted into a central portion of the retainer member and an upper end side attached to the tank cover (12).

According to this embodiment, it is possible to construct the retainer member and the coupling member in a coaxial structure to thereby make compact the coupling mechanism. The pivot can be provided on the outer circumference of the retainer member so that the reservoir and the retainer member may readily be coupled in a rotatable fashion with each other.

A coil spring (33) for biasing the retainer member (30) toward the inner bottom surface (1c) of the fuel tank (1) may be provided on an outer circumference of the coupling member (31).

According to this embodiment, the reservoir (11) can be depressed against the inner bottom surface of the fuel tank by the force of the coil spring. Since the coil spring is mounted around the outer circumference of the coupling member formed as the shaft member, it is possible to use the coil spring with a small inner diameter that is substantially the same as the outer diameter of the retainer member. It is possible to maintain the coupling mechanism in a compact structure.

The coupling member (47) may rotatably be connected to the tank cover (12) and the retainer member (44), respectively.

According to this embodiment, the reservoir can be moved in the vertical direction by the combination of the rotational motion of the retainer member about the pivot relative to the reservoir and the rotational motion of the coupling member relative to each of the retainer member and the tank cover, and at the same time, can entirely or partially be moved in a direction along the inner bottom surface of the fuel tank. By utilizing these movements, it is possible to insert all or part of the reservoir into the deeper portion from the region just below the opening portion of the fuel tank.

A torsion coil spring (48) for imparting a force in a direction for depressing the reservoir (41, 51) onto the inner bottom surface (1c) of the fuel tank (1) may be provided at a joint portion (45) between the retainer member (44) and the coupling member (47).

According to this embodiment, since the coil spring is disposed at the joint portion between the retainer member and the coupling member, it is possible to make compact the coupling mechanism.

The reservoir (51) may be provide with a main body (52) and a movable portion (54) connected to the main body so as to be extendable from the main body toward a side of the reservoir, and the retainer member (44) may rotatably be connected to the movable portion.

According to this embodiment, in the case where the reservoir is suspended through the coupling mechanism from the tank cover, the movable portion can be retracted into the main body due to the gravitational force act to the reservoir whereby the reservoir may be inserted into the fuel tank through the narrow opening portion. After the reservoir has been brought into contact with the inner bottom surface of the fuel tank, the tank cover is further depressed toward the opening portion. This operation is transmitted to the movable portion through the coupling mechanism. Thus, the movable portion may be extended from the main body and inserted into the deeper portion of the fuel tank.

In order to solve the foregoing objects, according to another aspect of the present invention, there is provided a fuel supplying apparatus (10D) comprising a reservoir (61) to be inserted from an opening portion (1b) provided in an upper portion of a fuel tank (1), and a tank cover (12) for closing the opening portion of the fuel tank (1), wherein the reservoir is provided with a support member (64) capable of moving between an insertion position (P1) in which the support member is suspended from the reservoir and an installation position (P2) in which the support member extends toward a side of the reservoir, a fuel pump (16) is received in the reservoir, and at least one component (20) to be interposed between an outlet port (16a) of the fuel pump and an outlet port (12a) of the tank cover is mounted on the support member.

According to this invention, when the reservoir is to be inserted into the fuel tank, the support member is moved to the insertion position, and the components mounted on the support member and the reservoir can be inserted in order from the opening portion into the fuel tank. Then, the support member inserted into the fuel tank is moved to the installation position whereby the components mounted on the support member may be inserted into the deeper portion of the fuel tank beyond the region just below the opening portion of the fuel tank. Thus, since the components are disposed outside of the reservoir, it is possible to increase the capacity of the reservoir in comparison with the case where the components are to be received in the reservoir. Also, since it is not necessary to keep the space for the components between the reservoir and the tank cover, it is possible to reduce the height of the fuel tank.

In the fuel supplying apparatus according to the above invention, a fuel filter (20) may be mounted on the support member (64) as the component.

According to this embodiment, the fuel filter which has a relatively large volume out of the components to be arranged within the fuel tank can be disposed outside of the reservoir. Therefore, it is possible to sufficiently increase the capacity of the reservoir.

In order to solve the foregoing objects, according to still another aspect of the present invention, there is provided a fuel supplying apparatus (10B, 10D, 10E) comprising a tank cover (12) for closing an opening portion (1b) of a fuel tank (1), a first unit (UN1) suspended from the tank cover into the fuel tank, and a second unit (UN2) coupled with the first unit so as to movable in a predetermined direction relative to the first unit, wherein one of the first and the second units is provided with a reservoir (41, 61, 81) housed therein a fuel pump (16) and another of the first and the second units is provided with a fuel filter (20, 90).

According to this invention, the tank cover, the first and the second units are assembled as a module capable of integrally being attached to or detached from the fuel tank. Thus, it is possible to efficiently attach or detach various components of the fuel supplying apparatus to or from the fuel tank. The posture of the apparatus can be changed between an insertion state suitable for inserting the apparatus into the fuel tank through the narrow opening portion thereof and an installation state suitable for installing the apparatus in the fuel tank having limited height by changing the position of the second unit relative to the first unit. Since the fuel filter and the fuel pump, each of which constitutes a main component of the fuel supplying apparatus, are disposed in the separate units, the components may not be concentrated in one of the units. Therefore, it is possible to design both units in a size capable of easily being inserted into the fuel tank through the narrow opening portion thereof. The fuel filter and the fuel pump can be connected through a flexible hose so that there is no problem even if the second unit is moved relative to the first unit.

In the fuel supplying apparatus according to the above invention, the second unit (UN2) may be capable of moving away from the first unit (UN1) toward a side of the fuel tank (1). According to this embodiment, the second unit can be arranged away from the first unit inserted in the fuel tank to thereby reduce the height of the fuel tank. Incidentally, the movement of the second unit can include both parallel motion and rotational motion.

The first unit (UN1) may be provided with the fuel filter (20) and the second unit (UN2) may be provided with the reservoir (41) housed therein the fuel pump (16). According to this embodiment, it is possible to insert the reservoir and the fuel pump toward the deeper portion of the fuel tank from the region just below the tank cover. In this embodiment, the reservoir (41) may be capable of moving away from the first unit (UN1) toward a side of the fuel tank (1). In this case, the reservoir and the fuel pump can be disposed away from the fuel filter suspended just below the tank cover toward a side of the fuel tank to thereby reduce the height of the fuel tank. Incidentally, the movement of the reservoir can also include both parallel motion and rotational motion.

The second unit (UN2) may be capable of moving between an insertion position (P1) in which the second unit is suspended downward from the first unit (UN1) and an installation position (P2) in which the second unit is disposed above the insertion position toward the tank cover (12). According to this embodiment, when in the insertion operation, the second unit can be moved to the insertion position to thereby insert the second unit independently. After inserting the second unit, the second unit can be moved to the installation position to reduce the fuel supplying apparatus, thereby allowing the first unit to be inserted into the fuel tank.

The first unit (UN1) may be provided with the reservoir (61, 81) and the second unit (UN2) may be provided with the fuel filter (20, 90). According to this embodiment, the fuel filter can be inserted into the deeper portion of the fuel tank beyond the region just below tank cover to thereby utilize the region below the tank cover as a space for accommodating the reservoir and the fuel pump. In this embodiment, the second unit (UN2) may be coupled with the first unit (UN1) so as to be rotatable about a horizontal axis. In this case, it is possible to readily provide the above apparatus by only rotatably connecting the second unit with the reservoir.

DESCRIPTION OF THE PREFERRED EMBODIMENTS

Embodiments of the present invention will now be described with reference to the accompanying drawings.

Figure 1:
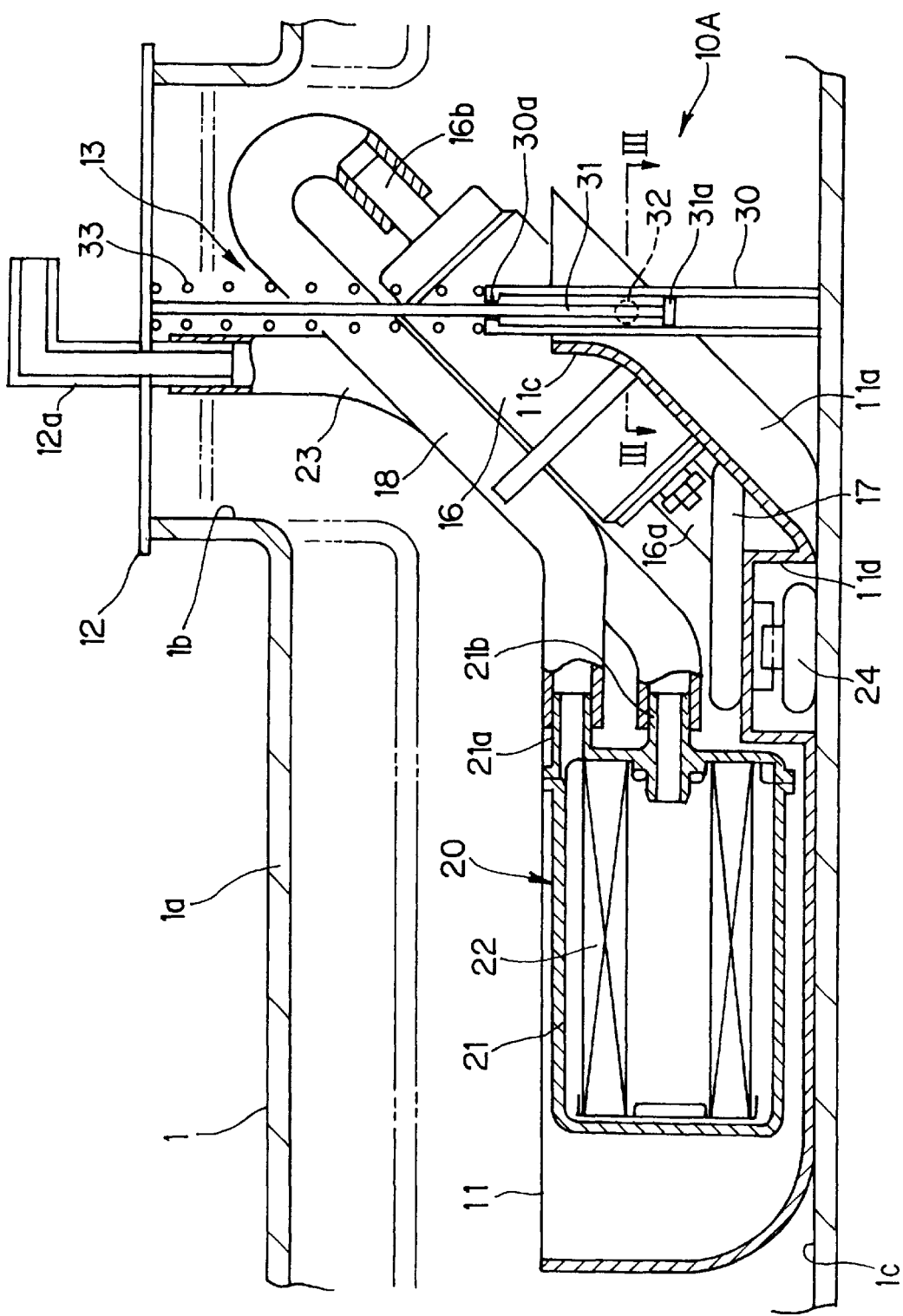
FIG. 1 is a partially fragmentary view showing a fuel supplying apparatus according to a first embodiment of the present invention.
Figure 2:
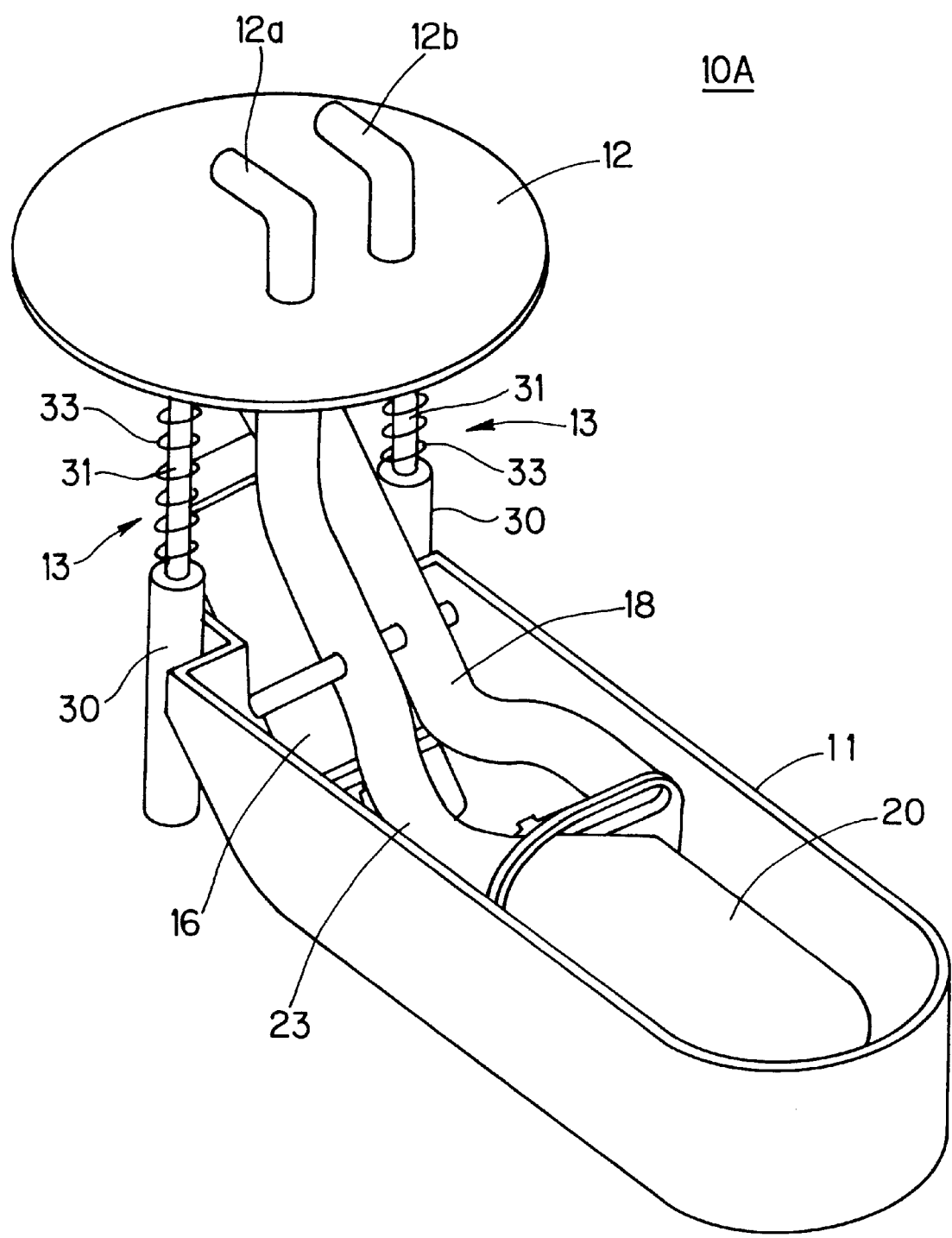
FIG. 2 is a perspective view showing the fuel supplying apparatus shown in FIG. 1.

FIGS. 1 and 2 show a fuel supplying apparatus in accordance with a first embodiment of the present invention. A vertical direction of FIG. 1 corresponds to a vertical direction of the fuel tank 1. The fuel supplying apparatus 10A is provided with a reservoir 11 to be inserted into the fuel tank 1, a tank cover 12 for closing an opening portion 1b formed in an upper wall 1a of the fuel tank 1, and a pair of coupling mechanisms 13 (see FIG. 2) for coupling the reservoir 11 and the fuel tank 1 with each other to be mutually displaceable. The fuel tank 1, the reservoir 11 and the tank cover 12 are made of, for example, resin.

The reservoir 11 is formed into a flat container-like shape having a large overall length in comparison with its height. The reservoir 11 is laid on an inner bottom surface 1c of the fuel tank 1 under the condition that the reservoir 11 receives therein a fuel pump 16 and a fuel filter 20. As shown also in FIG. 3, a pump support wall 11a projecting in a semicircular shape in its cross-section is provided on one side of the reservoir 11 in the longitudinal direction thereof. The pump support wall 11a is slanted so as to project sideward as it goes toward the upper end thereof. The fuel pump 16 is mounted on the inside of the pump support wall 11a and slanted obliquely from the vertical direction of the fuel tank 1. Thus, the height of the fuel pump 16 within the fuel tank 1 is decreased so that the height of the fuel tank 1 (a dimension in the vertical direction of FIG. 1) may be decreased. Incidentally, it is preferable that a slant angle of the pump 16 relative to the vertical plane is set at a value equal to or less than 45°, for example.

A suction filter 17 is mounted at an inlet port 16a at the lower end of the fuel pump 16. The fuel within the reservoir 11 is sucked up to the fuel pump 16 through this suction filter 17. On the other hand, an outlet port 16b of the fuel pump 16 is connected to an inlet port 21a of the fuel filter 20 through a hose 18.

The fuel filter 20 has a housing 21 formed of resin or the like and a filter element 22 having a hollow cylindrical form and fit in the interior of the housing 21. The fuel introduced from the inlet port 21a to the interior of the housing 21 passes the filter element 22 from an outer circumferential side toward the central portion thereof. Thereafter, the fuel is introduced from an outlet port 21b of the housing 21 through a hose 23 to a lower end portion of an outlet pipe 12a of the tank cover 12. An upper end portion of the outlet pipe 12a projects upwardly of the tank cover 12. The fuel discharged from the projecting portion of the outlet pipe 12a is fed to the fuel injection device (not shown) of the automotive vehicle. A necessary amount of the fed fuel is injected into cylinders of an internal combustion engine through the fuel injection device. An extra amount of fuel generated in the fuel injection device is returned back to the interior of the fuel tank 1 from a return pipe 12b (see FIG. 2) of the tank cover 12. The returned fuel is discharged into the interior of the reservoir 11 after passing through the interior of a suction filter 24 mounted on a recessed portion 11d of the reservoir 11. The outside fuel of the reservoir 11 is sucked into the suction filter 24 by utilizing a negative pressure when the extra fuel has passed therethrough.

Each of the coupling mechanisms 13 has a hollow cylinder 30 as a retainer member and a rod 31 as a coupling member slidably inserted into a central portion of the cylinder 30. As shown also in FIG. 3, a crank pin 32 is provided on an outer circumference of each cylinder 30, and each pin 32 is rotatably engaged with a coupling hole 11b formed in the pump support wall 11a of the reservoir 11. The cylinder 30, the rod 31 and the crank pin 32 are made of resin, metal material or the like and have a rigidity enough to bind, to a predetermined position within the fuel tank 1, the reservoir 11 on which the fuel pump 16, the fuel filter 20 and the like are mounted.

Figure 3:
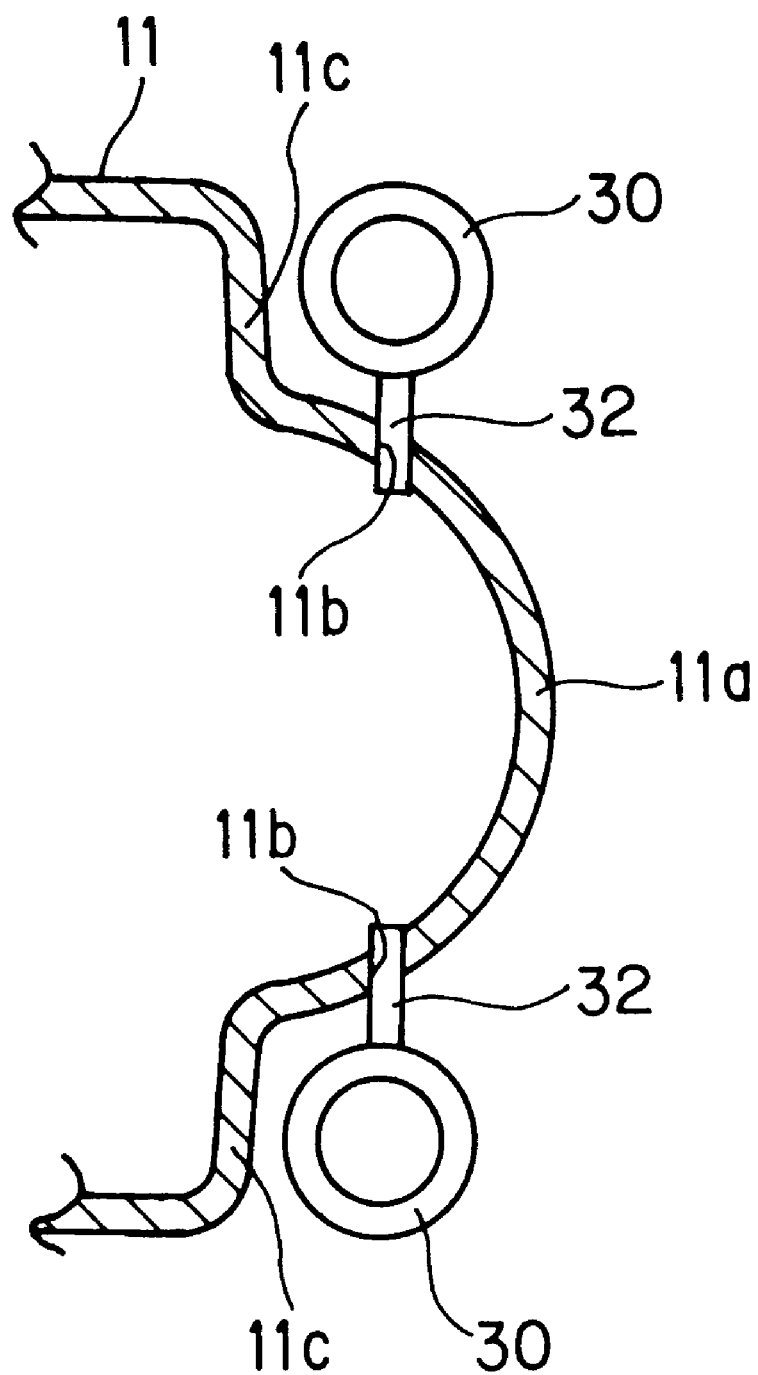
FIG. 3 is a cross-sectional view taken along the line III—III of FIG. 1.

Incidentally, in the example shown in FIGS. 1 to 3, the pair of coupling mechanisms 13, 13 are provided and the cylinders 30, 30 of the respective coupling mechanisms 13, 13 are arranged so as to put the pump support wall 11a therebetween. On one side of the reservoir 11, there are provided stop portions 11c, 11c which face the cylinders 30, 30. When the reservoir 11 rotates clockwise from the position of FIG. 1 about the crank pins 32, the stop portions 11c are brought into contact with the cylinders 30 to thereby limit the further rotational motion of the reservoir 11. As a result, there is no possibility that the other end side (i.e., the left side of FIG. 1) of the reservoir 11 would be lifted within the fuel tank 1.

A small diameter portion 30a is formed at an upper end of each cylinder 30 and a large diameter portion 31a engaged with the small diameter portion 30a is formed at a lower end of the rod 31. Thus, the upward pull of the rod 31 away from the cylinder 30 is prevented. The upper end of the rod 31 is fixed to the lower surface side of the tank cover 12 by utilizing a fastening means such as bolts or the like. A biasing means such as a spring 33 is mounted on the outer circumference of the rod 31 under the compressed condition to a suitable extent. The reservoir 11 coupled through the cylinders 30 and the crank pins 32 is depressed onto the inner bottom surface 1c of the fuel tank 1 by the repulsive force of the coil springs 33.

Figure 4:
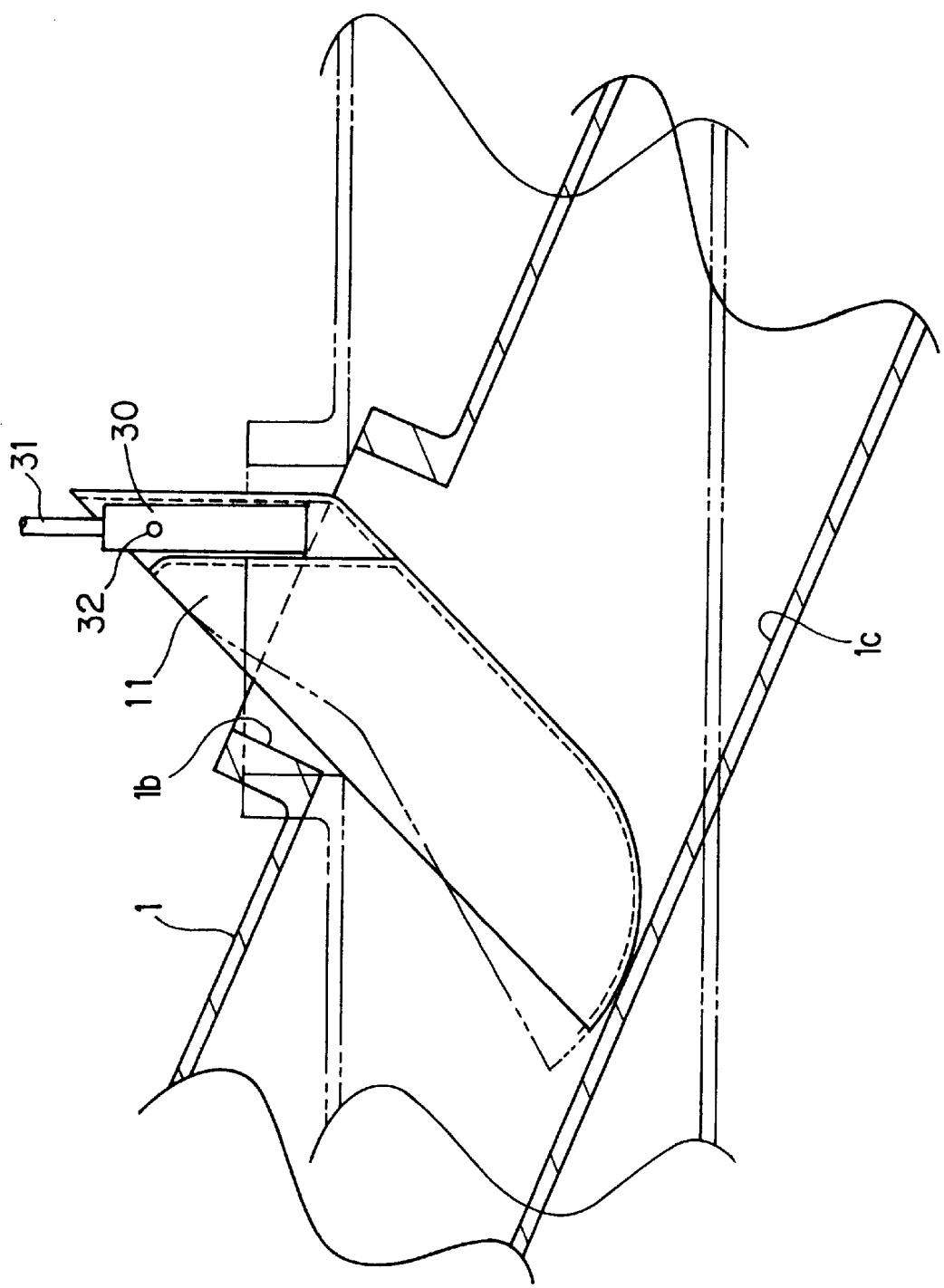
FIG. 4 is a view showing a state in which the reservoir shown in FIG. 1 is to be inserted into the fuel tank.

With such coupling mechanisms 13, the reservoir 11 and the tank cover 12 are coupled with each other through the cylinders 30 and the rods 31, and in addition, the reservoir 11 can rotate at pivot points of the crank pins 32 relative to the cylinders 30. Accordingly, when the reservoir 11 is to be inserted into the fuel tank 1, as shown in FIG. 4, the reservoir 11 can be rotated relative to the cylinders 30 so that the posture of the reservoir 11 is changed relative to the tank cover 12. Thus, it is possible to easily insert the reservoir 11, having the large overall length, from the narrow opening portion 1b into the fuel tank 1.

Then, since the reservoir 11 inserted into the fuel tank 1 is coupled with the tank cover 12 through the cylinders 30 and the rods 31 to be retained in a predetermined position, it is not necessary to couple the reservoir 11 with the other member within the fuel tank 1 and to fix the reservoir 11 to the inner bottom surface 1c of the fuel tank 1. Accordingly, in case of assembling the fuel supplying apparatus, only the following operational steps are required. Namely, all the components, such as the fuel pump 16, the suction filters 17 and 24, the fuel filter 20, the hoses 18 and 23 are mounted on the reservoir 11 in advance, the reservoir 11 and the tank cover 12 are coupled with each other through the coupling mechanisms 13, further, the electrical wiring are arranged for the fuel pump 16 and the like, the reservoir 11 is inserted into the fuel tank 1, and the tank cover 12 is fixed around the opening portion 1b by using bolts or the like. Also, in the case where the reservoir 11 is to be removed away from the fuel tank 1, it is only necessary to remove the tank cover 12 and to pull the reservoir 11 upwardly from the opening portion 1b.

In the case where the fuel tank 1 is deformed due to the pressure difference between the interior and the exterior, as indicated by two-dot and dash lines in FIG. 1, the cylinders 30 and the rods 31 are slid each other to thereby absorb the deformation therebetween. Also, when the fuel tank 1 is displaced in the vertical direction thereof due to the vibration of the automotive vehicle, the cylinders 30 and the rods 31 are slid in the same manner to absorb the displacement therebetween.

Incidentally, as indicated by two-dot and dash lines (phantom lines) in FIG. 4, the shape of the upper edge of the reservoir 11 is not limited to a linear shape. It is possible to suitable modify it to the shape that is convenient to pass the reservoir 11 through the opening portion 1b.

Figure 5:
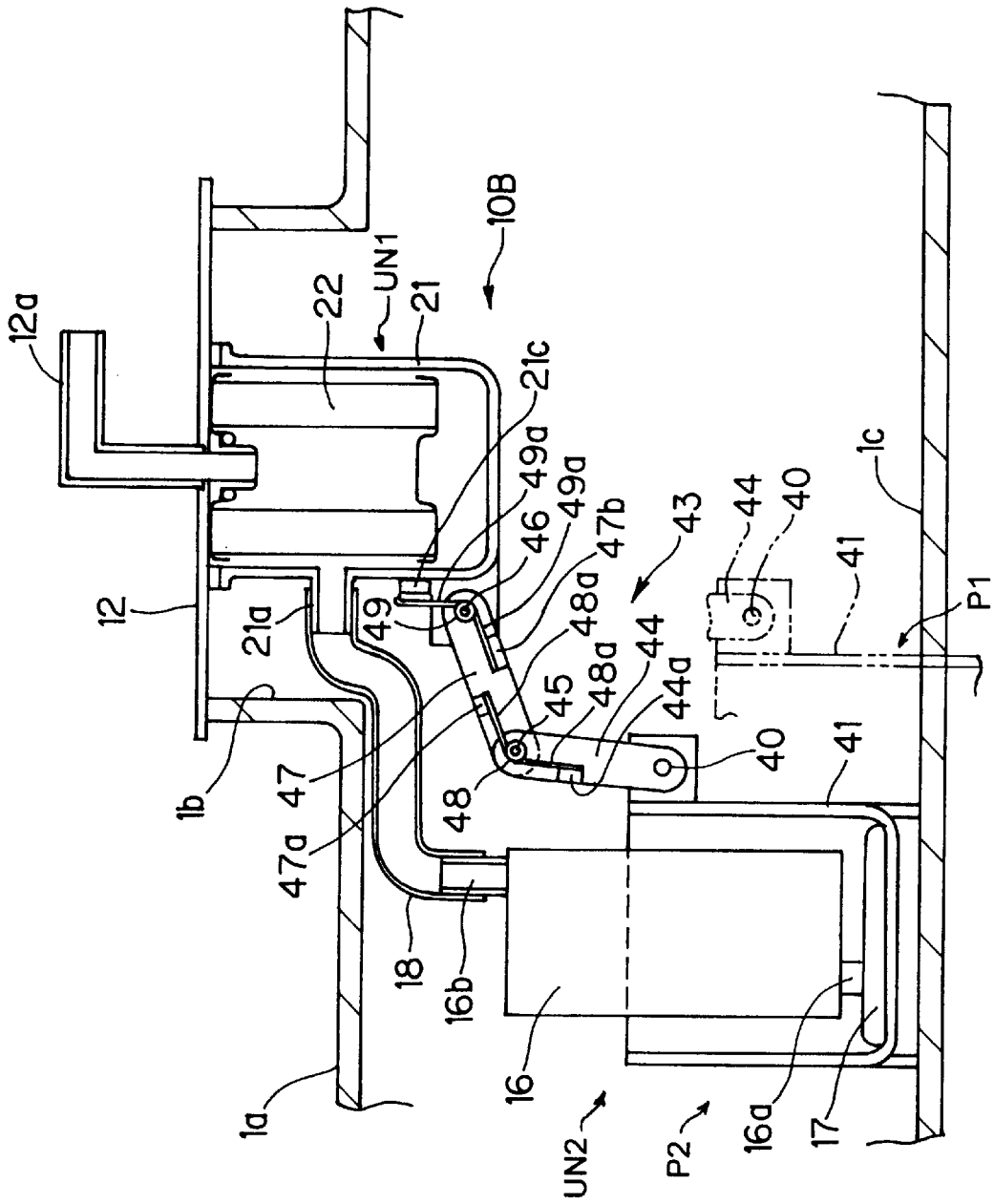
FIG. 5 is a partially fragmentary view showing a fuel supplying apparatus according to a second embodiment of the present invention.

FIG. 5 is a view showing a second embodiment of the present invention. In FIG. 5, the same reference numerals are used to indicate the common components or members shown in FIGS. 1 to 4.

The fuel supplying apparatus 10B in FIG. 5 is provided with a reservoir 41 to be inserted into the fuel tank 1, a tank cover 42 for closing the opening portion 1b formed in the upper wall 1a of the fuel tank 1, and a coupling mechanism 43 for coupling the reservoir 41 and the fuel tank 1 with each other to be mutually displaceable.

The reservoir 41 is formed into a cylindrical container whose upper end is open. The fuel pump 16 is received in an upright condition, i.e., the condition in which the axis thereof coincides with the vertical direction of the fuel tank 1. The central portion of the tank cover 12 is integrated with the housing 21 of the fuel filter 20. Then, the lower end portion of the outlet pipe 12a provided in the middle of the tank cover 12 is engaged with the central portion of the filter element 22.

The coupling mechanism 43 has a first link 44 used as a retainer member rotatably coupled through a pin 40 to the outer circumferential portion of the upper end of the reservoir 41 and a second link 47 used as a coupling member rotatably coupled to both the link 44 and the housing 21 of the fuel filter 20 through pins 45 and 46.

Biasing means such as torsion coil springs 48 and 49 are provided around the pins 45 and 46. Arms 48a and 48a of the torsion coil spring 48 abut against spring receivers 44a and 47a provided on the links 44 and 47, respectively. As a result, a clockwise force about the pin 45 is applied to the link 47 and a counterclockwise force about the pin 45 is applied to the like 47, respectively. On the other hand, arms 49a and 49a of the torsion coil spring 49 abut against spring receivers 47b and 21c provided on the link 47 and the housing 21, respectively. As a result, a counterclockwise force about the pin 46 is applied to the link 47 and a clockwise force about the pin 46 is applied to the housing 21, respectively. The forces given by the torsion coil springs 48 and 49 cause the reservoir 41 to be depressed against the inner bottom surface 1c of the fuel tank 1.

With such a coupling mechanism 43, in the case where the reservoir 41 and the tank cover 12 are removed away from the fuel tank 1, the links 44 and 47 are moved to be substantially straightened in the vertical direction by the torsion coil springs 48 and 49. In accordance with this movement, the reservoir 41 is moved from an installation position P2 indicated by the solid lines to an insertion position P1 indicated by the phantom line (two-dot and dash lines in FIG. 5). Under this condition, the reservoir 41 is inserted from the opening portion 1b to the fuel tank 1. While the reservoir 41 is being moved toward the side of the fuel tank 1 from a region just below the opening portion 1b, the tank cover 12 is fixed around the opening portion 1b to thereby complete the mounting operation of the reservoir 41, the tank cover 12 and the like.

In this embodiment, since the reservoir 41 is moved from the region just below the tank cover 12 to the side, a height of the reservoir 41 and the fuel pump 16 to be received in the reservoir 41 is not limited by the fuel filter 21. Also, the downward projection amount of the fuel filter 20 from the tank cover 12 is not limited by the reservoir 41 and the fuel pump 16. Thus, it is possible to considerably reduce the height of the fuel tank 1 in comparison with the case where the fuel pump 16 and the fuel filter 20 are aligned with each other in the vertical direction of the fuel tank 1.

Since the reservoir 41 inserted into the fuel tank 1 is retained in the predetermined position by the links 44 and 47, it is not necessary to fix the reservoir 41 to the inner bottom surface 1c of the fuel tank 1 with coupling the reservoir 41 and the other components within the fuel tank 1. In the case where the fuel tank 1 is deformed due to the pressure difference between the interior and the exterior thereof, the links 44 and 47 operate so as to absorb the displacement of the tank 1. The same operation may be occurred with respect to the displacement (the variation of the height) in the vertical direction of the fuel tank 1 due to the vibration of the automotive vehicle. Incidentally, it is possible to provide a single coupling mechanism 43 and two or more coupling mechanisms 43. The fuel pump 16 may be installed horizontally. The coupling mechanism 43 may be replaced with the type disclosed in the first embodiment. In the fuel supplying apparatus 10B, the fuel filter 20 attached to the tank cover 12 corresponds to a first unit UN1 and an assembly of the reservoir 41, the fuel pump 16 housed therein and the like corresponds to a second unit UN2.

Figure 6:
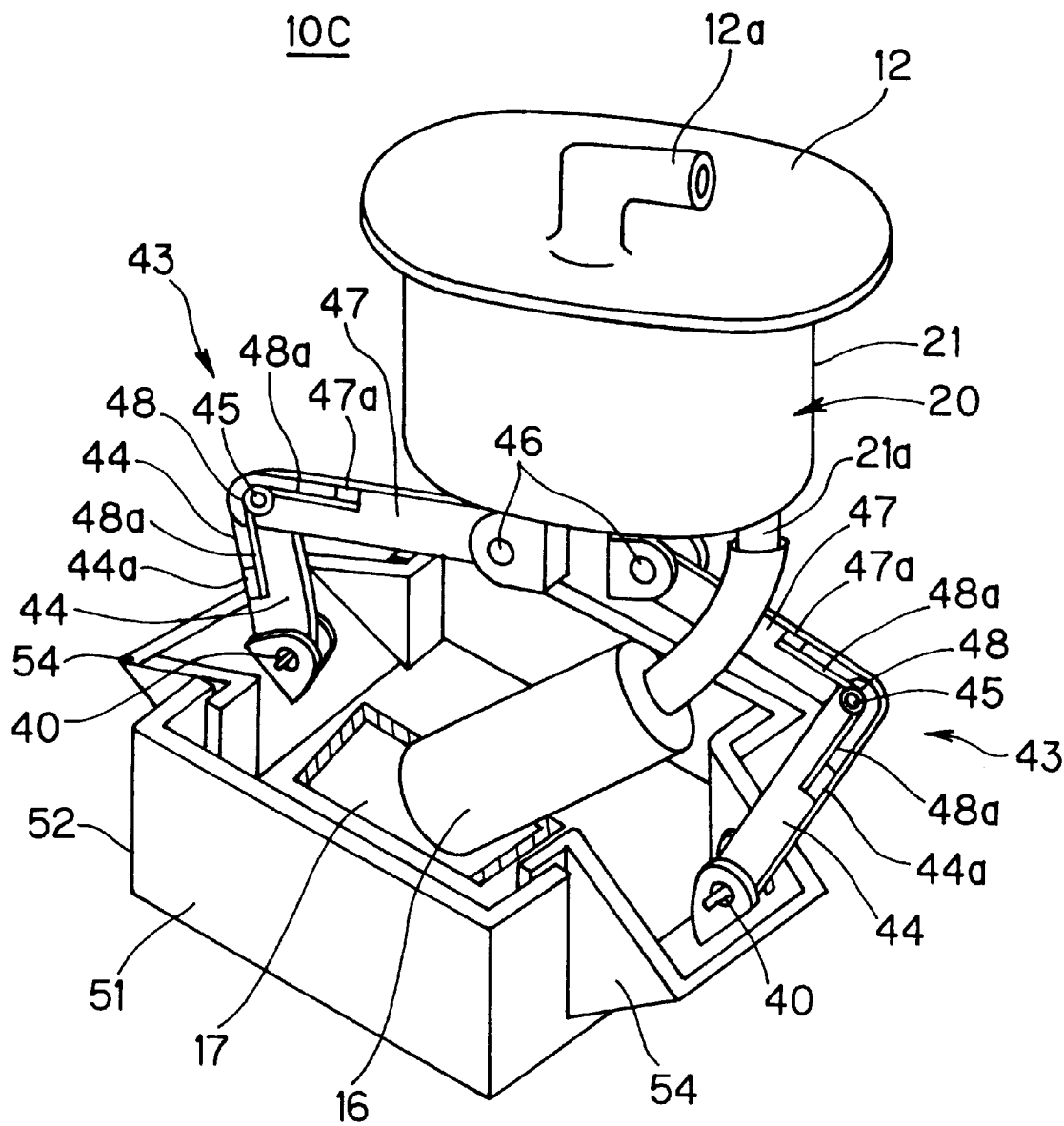
FIG. 6 is a perspective view showing a fuel supplying apparatus in accordance with a third embodiment of the present invention.
Figure 7A:
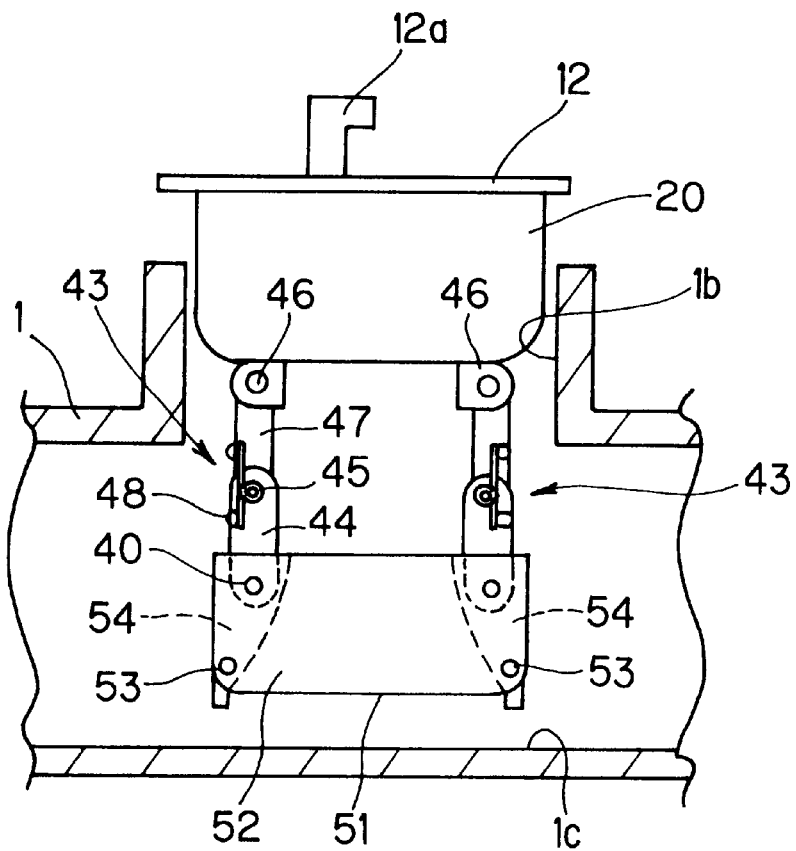
FIGS. 7A and 7B are views showing a state in which the fuel supplying apparatus shown in FIG. 6 is attached to or detached from the fuel tank.
Figure 7B:
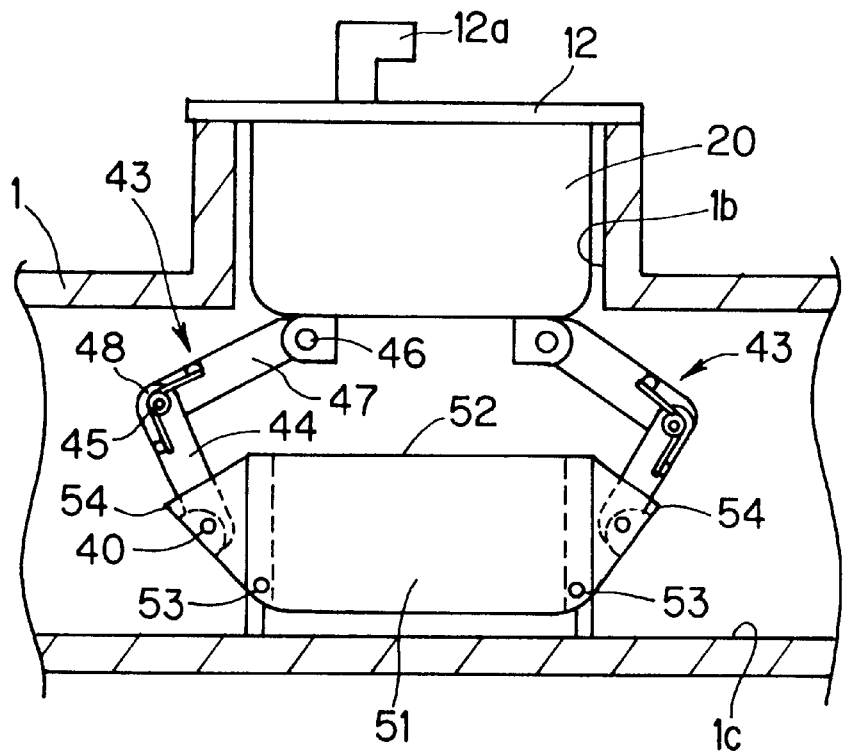

FIGS. 6, 7A and 7B show a third embodiment of the present invention. In FIGS. 6, 7A and 7B, the same reference numerals are used to indicate the common components or members shown in FIGS. 1 to 5. In the fuel supplying apparatus 10C shown in FIGS. 6, 7A and 7B, the tank cover 12 integrated with the housing 21 of the fuel filter 20 and the reservoir 51 are coupled with each other through a pair of coupling mechanisms 43 mainly composed of the links 44 and 47. The structure of each coupling mechanism 43 and the tank cover 12 is substantially the same as that of the example shown in FIG. 5. However, in the embodiment shown in FIG. 5, the reservoir 41 is moved relative to the tank cover 12 not only in the vertical direction but also in the horizontal direction simultaneously. However, in this embodiment, each coupling mechanism 43 is constructed so that the reservoir 51 can only be moved in the vertical direction just below the tank cover 12. Also, in each coupling mechanism 43, the torsion coil spring 49 is omitted therefrom.

The reservoir 51 is provided with a main body 52 and movable portions 54, 54 coupled to the main body 52 through pins 53, 53 so as to be extendable from the main body 52 in the lateral direction of the reservoir 51. The links 44 of the coupling mechanisms 43 are rotatably coupled with the movable portions 54 through the pins 40.

In the above-described fuel supplying apparatus 10C, in the case where the reservoir 51 is inserted into the fuel tank 1, as shown in FIG. 7A, the reservoir 51 is suspended just below the tank cover 12, and the movable portions 54, 54 are retained under the condition that they are retracted into the main body 52 due to the gravitational force act on the main body 52. Under this condition, the reservoir 51 can pass through the opening portion 1b. When the reservoir 51 is brought into contact with the inner bottom surface 1c of the fuel tank 1 and the tank cover 12 is pushed toward the opening portion 1b, the links 44 and 47 operate so as to move the pins 45 connecting them toward the sides of the tank cover 12. In accordance with this operation, the movable portions 54, 54 rotate about the pins 53 and extend toward the sides of the main body 52 (see FIG. 7B). In this condition that the movable portions 54 are extended, the width of the reservoir 51 becomes greater than the diameter of the opening portion 1b.

Thus, in this embodiment, since the capacity of the reservoir 51 is increased within the fuel tank 1, it is possible to keep a necessary capacity while suppressing the increase of the height of the reservoir 51. Also, it is not necessary to increase the diameter of the opening portion 1b, because the movable portions 54 are stored in the body portion 52 when the reservoir 51 passes through the opening portion 1b. Also, it is not necessary to fix the reservoir 51 within the fuel tank 1 in the same manner as in the respective embodiments, because the reservoir 51 received in the fuel tank 1 is retained in the predetermined position by the coupling mechanisms 43. The reservoir 51 is depressed against the inner bottom surface 1c of the fuel tank 1 by the force of the torsion coil springs 48 and the displacement between the tank cover 12 and the reservoir 51 in the vertical direction is absorbed by the operation of the links 44 and 47.

Figure 8:
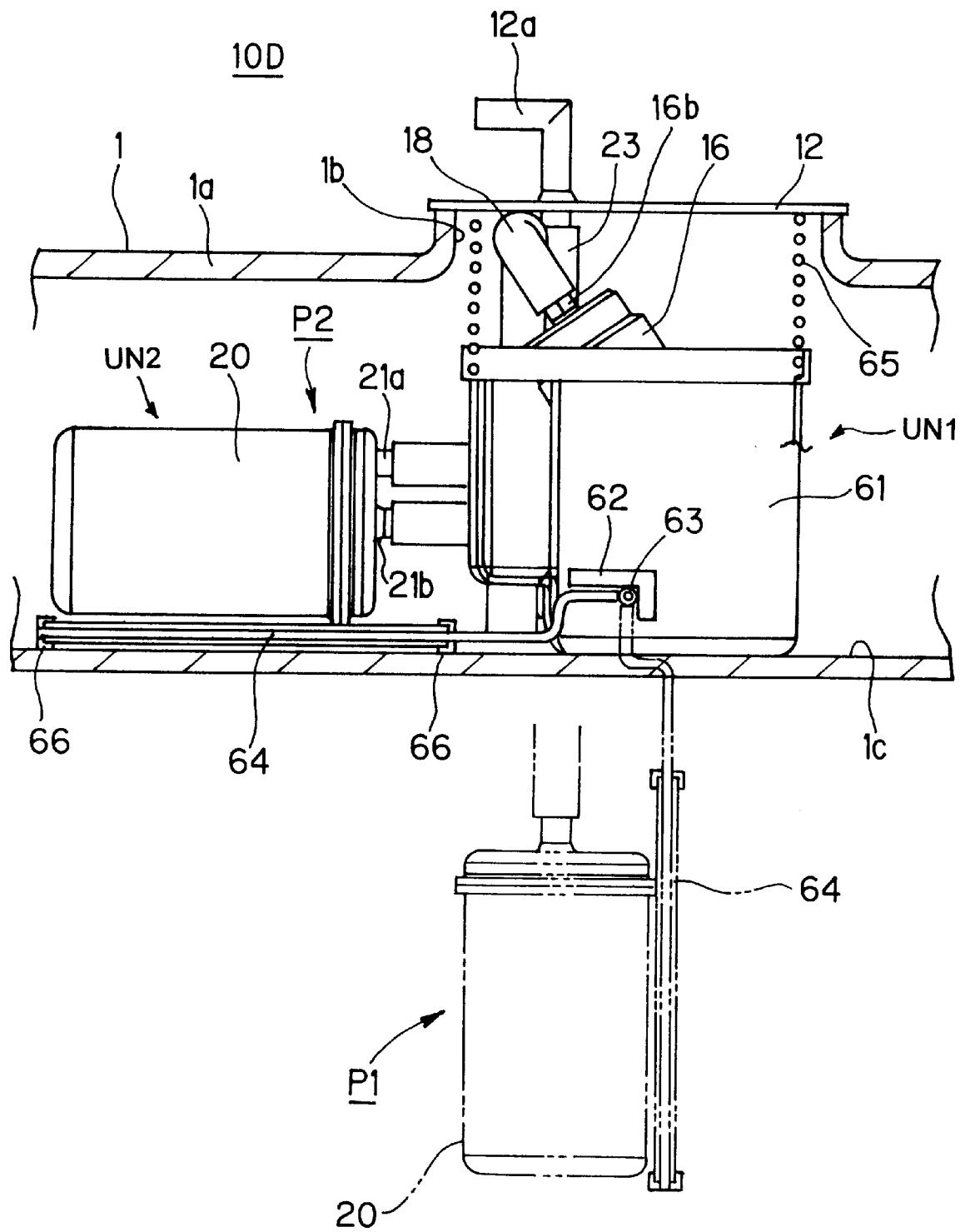
FIG. 8 is a view showing a fuel supplying apparatus in accordance with a fourth embodiment of the present invention.

FIG. 8 shows a fourth embodiment of the present invention. However, the same reference numerals are used to indicate the common components or members used in FIGS. 1 to 7. In the apparatus 10A to 10C in accordance with the foregoing first to third embodiments, there is a common point that the part of each of the reservoirs 11, 41 and 51 projects on one side relative to the region just below the opening portion 1b. However, in the fuel supplying apparatus 10D shown in FIG. 8, the reservoir 61 is formed in a cylindrical container having such a size that the reservoir can pass through the opening portion 1b of the fuel tank 1. Then, a coil spring 65 is mounted for depressing the reservoir against to the inner bottom surface 1c of the fuel tank 1 between the reservoir 61 and the tank cover 12.

A stop flange 62 is provided around an outer circumference of the reservoir 61. A bracket 64 used as a support member is mounted through a hinge 63 to be rotatable between an insertion position P1 where the bracket 64 is suspended below the reservoir 61 and an installation position P2 where the bracket 64 extends on one side of the reservoir 61. It should be however noted that the rotation of the bracket 64 on the right side beyond the insertion position P1 and the upward rotation thereof beyond the installation position P2 is prevented by the contact between the stop flange 62 and the bracket 64.

The fuel pump 16 is provided in the interior of the reservoir 61 to be slanted relative to the vertical plane. On the other hand, the fuel filter 20 is not received in the reservoir 61 but fixed onto the bracket 64. The connection of the fuel filter 20 to both of the outlet pipe 12a of the tank cover 12 and the fuel pump 16 is the same as that of the example shown in FIG. 1. In order to suppress the transmission of the vibration between the fuel tank 1 and the fuel filter 20, vibration isolating members 66 made of rubber or the like are mounted on the bracket 64.

With such a fuel supplying apparatus 10D, since the fuel filter 20 is installed outside of the reservoir 61, the capacity of the reservoir 61 is increased in comparison with the case where the fuel filter 20 is received therein. When the reservoir 61 is to be inserted into the fuel tank 1, the bracket 64 is rotated to the insertion position P1, and after the insertion, the bracket 64 is rotated to the installation position P2, whereby it is possible to receive the fuel filter 20 and the reservoir 61 in the fuel tank 1 without enlarging the opening portion 1b. The similar advantage can be obtained when the reservoir 61 is removed from the tank 1.

In the fuel supplying apparatus 10D, an assembly of the components such as the reservoir 61, the fuel pump 16 and the like corresponds to a first unit UN1, and an assembly of the bracket 64 and components mounted thereon, such as the fuel filter 20 and the like, corresponds to a second unit UN2.

Incidentally, it is possible to mount other components to be connected between the fuel pump 16 and the outlet pipe portion 12a (for example, the pressure regulator) instead of the fuel filter 20 or in addition to the fuel filter 20.

FIGS. 9 to 12 show a fifth embodiment of the present invention. However, the same reference numerals are used to indicate the common components or members used in FIGS. 1 to 8. In the fuel supplying apparatus 10E of this embodiment, the tank cover 12 is integrally formed at its lower surface with a cylindrical sleeve 80. At the inner side of the sleeve 80 is provided a reservoir 80. The reservoir 81 is provided with projections 81a . . . 81a at its upper end on the outer circumference thereof. These projections 81a are fit into slits 80a of the sleeve 80, and thus the reservoir 81 is coupled with the sleeve 80 so as to be movable in the vertical direction. Between a lid 81b of the reservoir 81 and the lower surface of the tank cover 12, there is provided a coil spring 82. The reservoir 81 is biased downwardly by the force of the coil spring 82, so that the bottom surface 81c of the reservoir 81 can be depressed onto the inner bottom surface 1c of the fuel tank 1 (see FIG. 12). At the lower end of the reservoir 81, there is provided a jet pump 85. The return pipe portion 12b provided on the tank cover 12 and the jet pump 85 are communicated with each other through a hose 86. Therefore, the extra fuel returned to the return pipe portion 12b is introduced into the jet pump 85 through the hose 86. The fuel accommodated outside the reservoir 81 can be sucked into the reservoir 81 through the suction filter 24 due to negative pressure occurred in accordance with the passage of the extra fuel.

The fuel pump 16 is provided in the reservoir 81. The fuel pump 16 can suck the fuel accommodated within the reservoir 81 from the suction port thereof (not shown) and can feed out from the outlet port 16b. One end of the hose 18 is connected with the outlet port 16b through a hose adapter 83. The other end of the hose 18 is connected with an inlet port 91a of a fuel filter 90 through a hose adapter 84. An outlet port 91b of the fuel filter 90 is communicated with the outlet pipe 12a of the tank cover 12. The fuel filter 90 has a housing 91 made of resin and a filter element (not shown) housed therein. The details of the inner configuration of the fuel filter 90 is substantially same as that of the fuel filter 20 shown in FIG. 1 so that the detailed explanation thereof is omitted.

Figure 9:
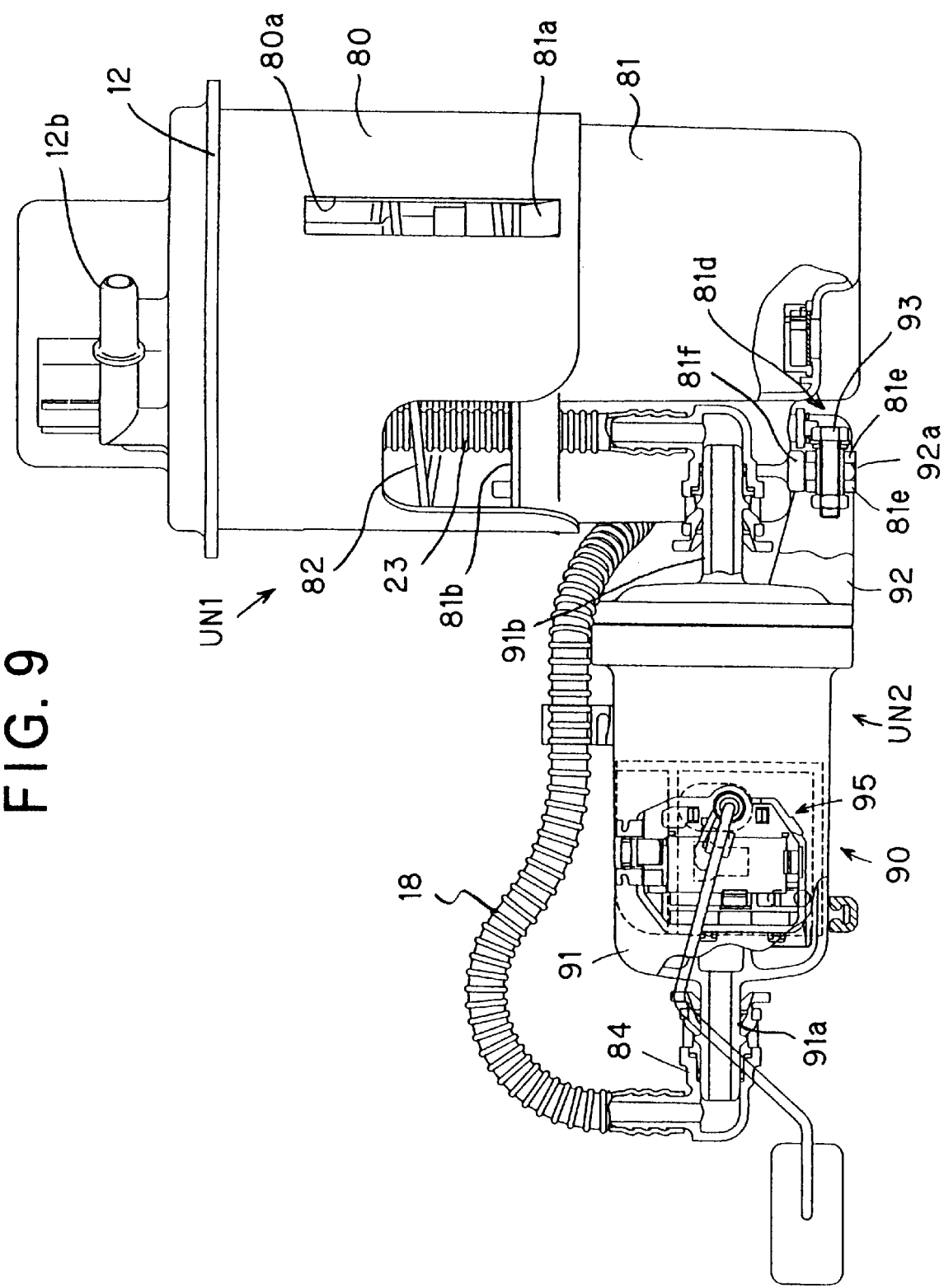
FIG. 9 is a front view showing a fuel supplying apparatus in accordance with a fifth embodiment of the present invention.
Figure 10:
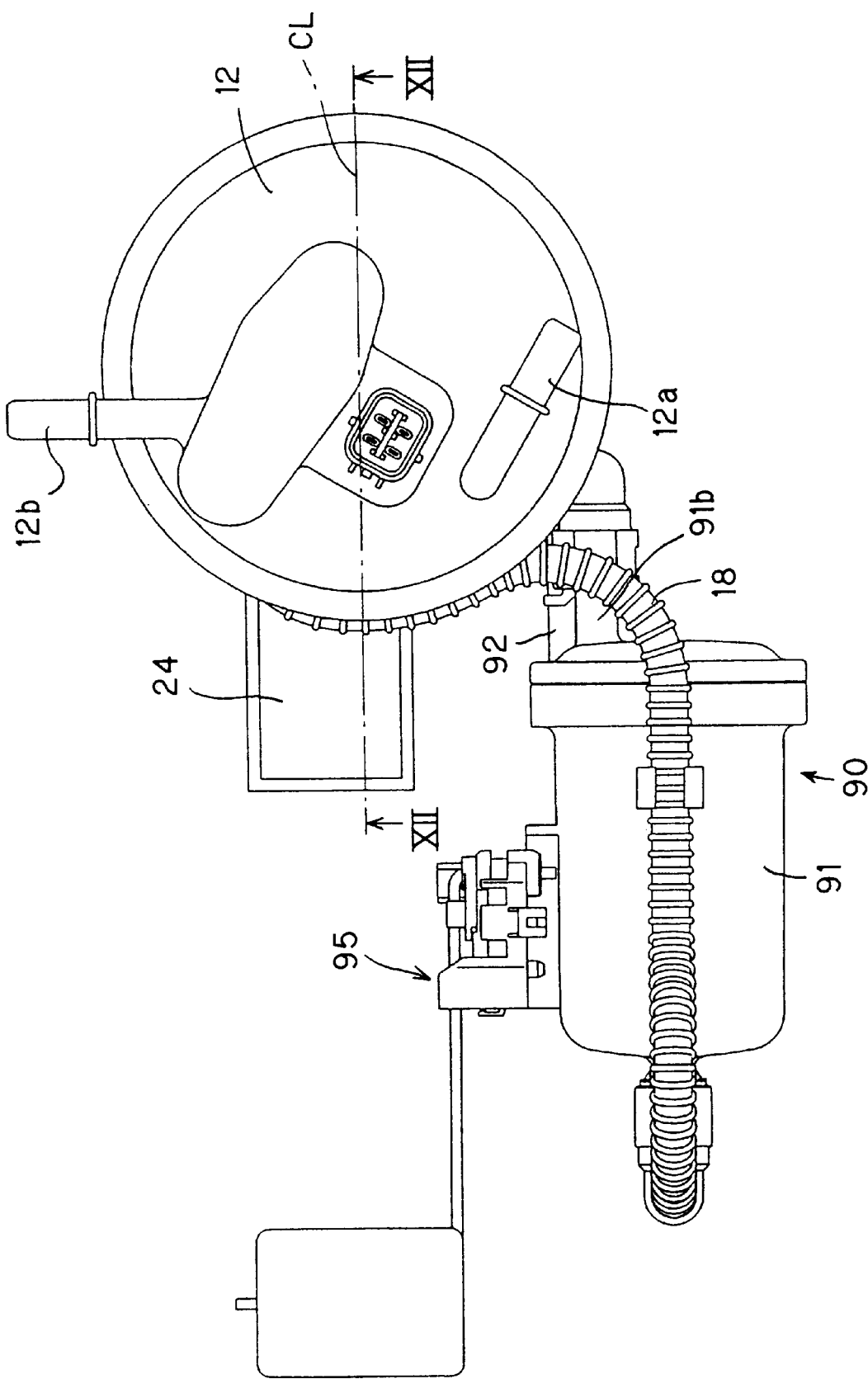
FIG. 10 is a plan view showing the fuel supplying apparatus shown in FIG. 9.
Figure 11:
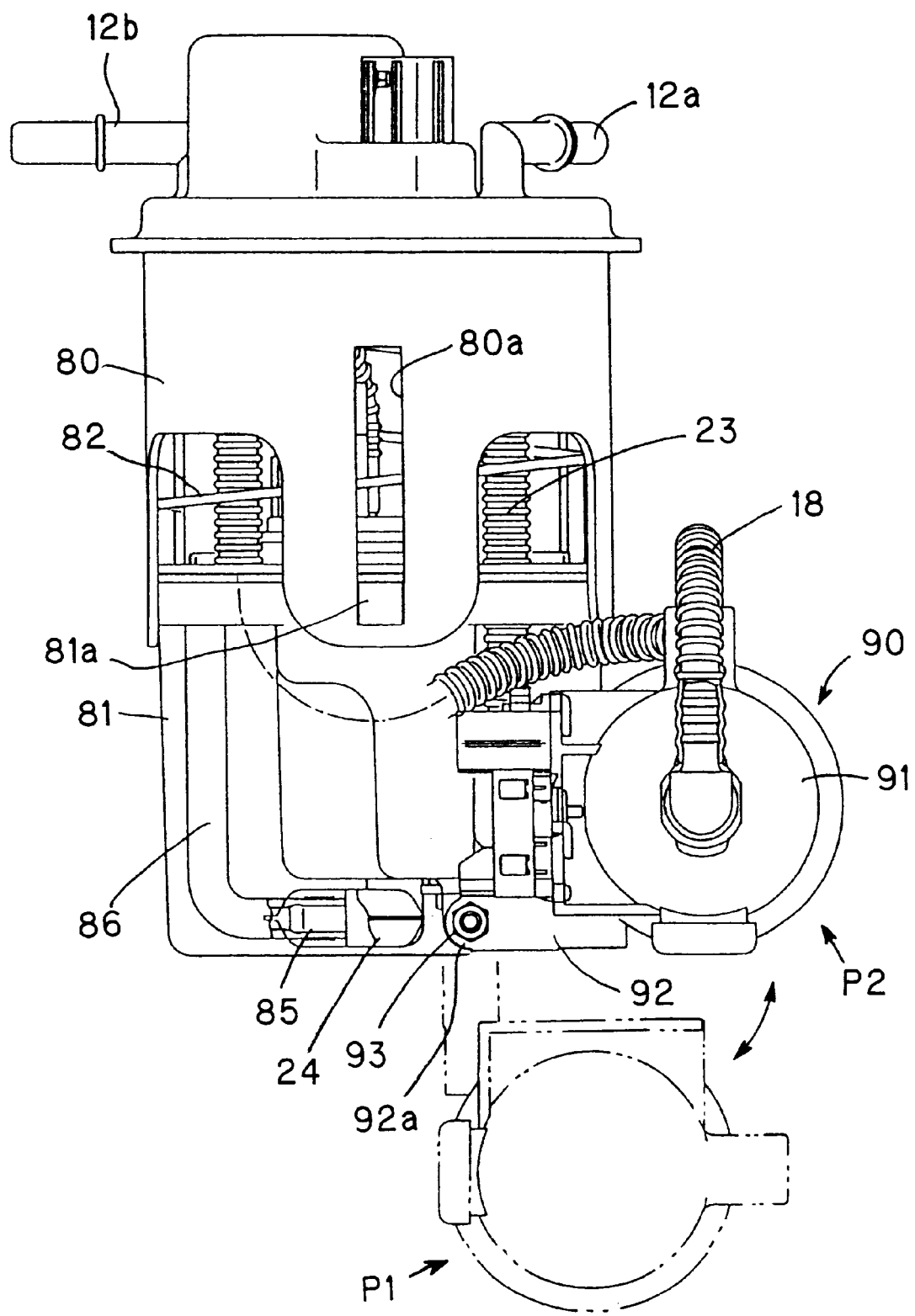
FIG. 11 is a left side view showing the fuel supplying apparatus shown in FIG. 9.
Figure 12:
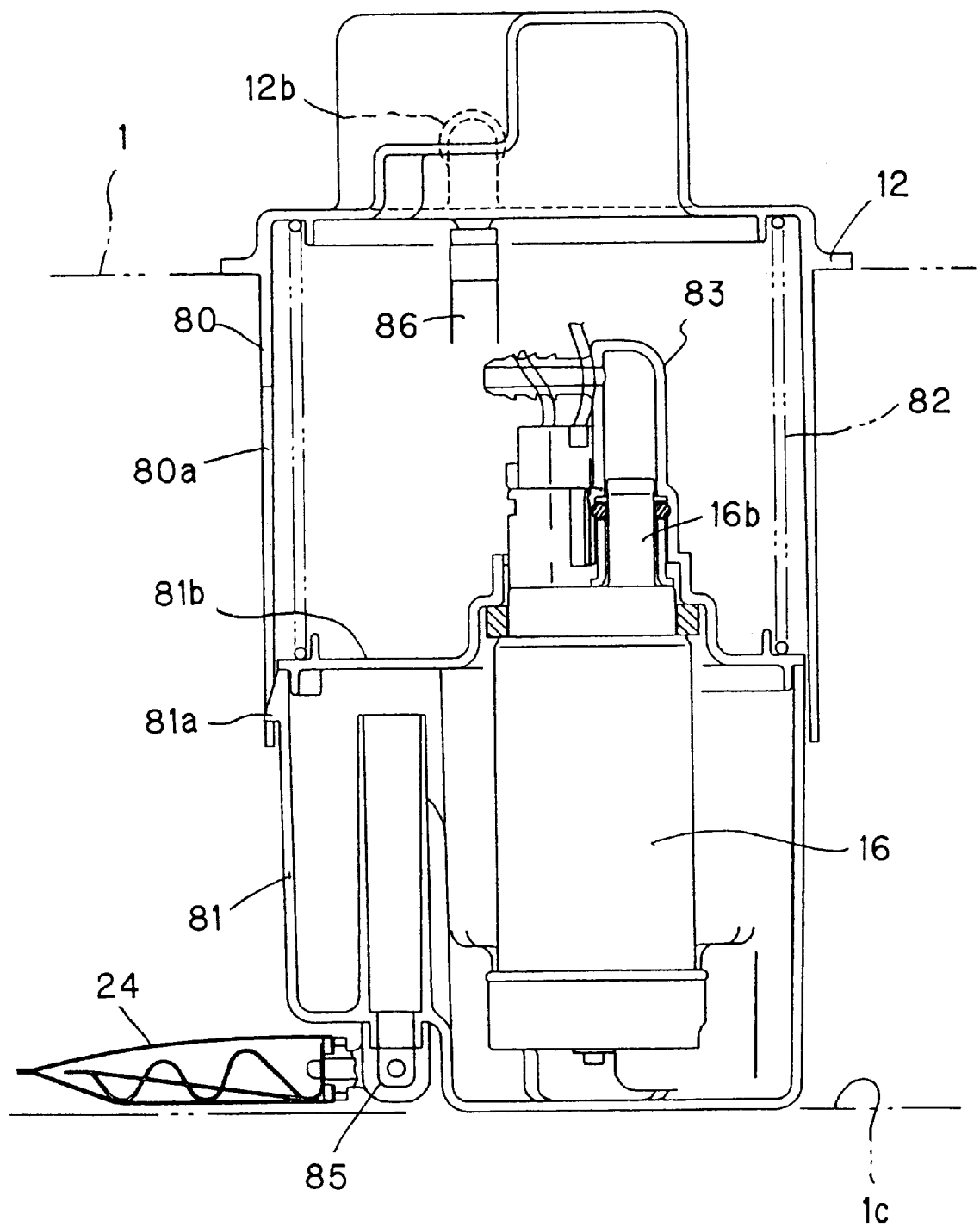
FIG. 12 is a sectional view taken along the line XII—XII of FIG. 11.

As is apparent from FIG. 9, the housing 91 of the fuel filter 90 is integrally formed with a connection arm 92. The reservoir 81 is formed with a recess 81d in which a pair of brackets 81e, 81e is provided so as to put a tip portion 92 a of the connection arm 92 therebetween. A bolt 93 is inserted from one of the brackets 81e to the other thereof through the tip portion 92a to thereby couple the housing 91 and the reservoir 81 with each other. Therefore, the fuel filter 90 can rotatably move between an insertion position P1 and an installation position P2 indicated in FIG. 11 with the bolt 93 being as a center.

When in the insertion position P1, the fuel filter 90 is suspended below the reservoir 81, so that the fuel filter 90 can readily be inserted into the fuel tank 1 through the opening portion 1b thereof. After inserting the filter 90, the filter 90 can be moved to the installation position P2 to thereby reduce the height of the fuel supplying apparatus 10E to allow the reservoir to be installed in the fuel tank 1.

In order to prevent the floating movement of the fuel filter 90 in the fuel tank 1, the reservoir 81 is provided with a stopper flange 81f above the brackets 81e, 81e. When the fuel filter 90 is in the installation position P2, the stopper flange 81f is brought into contact with the upper end of the tip portion 92a of the connection arm 92 to prevent the further upward rotation of the fuel filter 90 beyond the installation position P2.

Incidentally, the housing 91 of the fuel filter 90 is provided at its side surface with a sender unit 95 for measuring the amount of the fuel accommodated in the fuel tank 1. As is apparent from FIG. 10, the sender unit 95 is disposed on a position inside the fuel filter 90 held in the installation position P2 (a side near a center line CL of the tank cover 12 parallel to the axis of the bolt 93). When the fuel filter 90 is moved to the insertion position P1, the sender unit 95 is moved above the fuel filter 90.

In the above embodiment, an assembly of the sleeve 80, the reservoir 81 and the components housed therein, such as the coil spring 82, the fuel pump 16 and the like, corresponds to a first unit UN1, and an assembly of the fuel filter 90 and the sender unit 95 mounted thereon corresponds to a second unit UN2. Incidentally, the first and the second units can be comprise various components. For example, if a pressure regulator for adjusting the pressure of the fuel supplied to the fuel injection apparatus is disposed within the fuel tank, it is possible to attach it to the first or the second unit.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fuel supplying apparatus comprising:
   a tank cover for closing an opening portion of a fuel tank;
   a first unit suspended from the tank cover into the fuel tank; and
   a second unit coupled with the first unit so as to be rotatably movable in a predetermined direction relative to the first unit,
   wherein one of the first and the second units is provided with a reservoir in which a fuel pump is housed and another of the first and the second units is provided with a fuel filter.

2. The fuel supplying apparatus according to claim 1, wherein the second unit is capable of moving away from the first unit toward a side of the fuel tank.

3. The fuel supplying apparatus according to claim 1, wherein the first unit is provided with the fuel filter and the second unit is provided with the reservoir.

4. The fuel supplying apparatus according to claim 3, wherein the reservoir is capable of moving away from the first unit toward a side of the fuel tank.

5. The fuel supplying apparatus according to claim 1, wherein the second unit is coupled with the first unit in a pivotal manner to thereby be rotatable between an insertion position in which the second unit is suspended downward from the first unit and an installation position in which the second unit is disposed above the insertion position toward the tank cover.

6. The fuel supplying apparatus according to claim 1, wherein the first unit is provided with the reservoir and the second unit is provided with the fuel filter.

7. The fuel supplying apparatus according to claim 6, wherein the second unit is coupled with the first unit so as to be rotatable about a horizontal axis.

8. The fuel supplying apparatus according to claim 1, wherein the second unit is coupled with the first unit through a pivot to be rotatable relative to the first unit.

9. The fuel supplying apparatus according to claim 5, wherein the first unit has a stopper to prevent the further upward rotation of the second unit beyond the installation position.

10. A fuel supplying apparatus comprising:
    a tank cover for closing an opening portion of a fuel tank;
    a first unit suspended from the tank cover into the fuel tank; and
    a second unit coupled with the first unit so as to be movable in a predetermined direction relative to the first unit,
    wherein the first unit is provided with a reservoir in which a fuel pump is housed and the second unit is provided with a fuel filter.

11. The fuel supplying apparatus according to claim 10, wherein the second unit is coupled with the first unit so as to be rotatable about a horizontal axis.

* * * * *